United States Patent [19]

Fleckenstein

[11] Patent Number: 4,875,295
[45] Date of Patent: Oct. 24, 1989

[54] DROP-WEIGHT MATERIAL LEVEL INDICATOR

[75] Inventor: Phillip P. Fleckenstein, Port Huron, Mich.

[73] Assignee: Silomaster, Inc., Port Huron, Mich.

[21] Appl. No.: 217,695

[22] Filed: Jul. 11, 1988

[51] Int. Cl.$^4$ .............................................. G01F 23/04
[52] U.S. Cl. ........................................ 33/720; 33/715; 73/312; 73/321
[58] Field of Search ....................... 33/126.6, 719, 720, 33/715; 73/321, 309, 312; 254/271, 272

[56] References Cited

U.S. PATENT DOCUMENTS

| | | | |
|---|---|---|---|
| 2,754,596 | 7/1956 | O'Brien, Jr. | 33/126.6 |
| 2,809,518 | 10/1957 | Grandstaff | 254/272 X |
| 3,558,069 | 1/1971 | Feder | 242/36 |
| 3,838,518 | 10/1974 | Hendrickson | 33/126.6 |
| 4,213,019 | 7/1980 | Houp | 254/271 X |
| 4,255,859 | 3/1981 | Klieman | 33/126.6 |
| 4,318,227 | 3/1982 | Gravert | 33/720 |
| 4,532,500 | 7/1985 | Henk | 242/57 X |

FOREIGN PATENT DOCUMENTS 0279091  2/1970  U.S.S.R. ............................ 33/126.6

Primary Examiner—Daniel M. Yasich
Attorney, Agent, or Firm—Barnes, Kisselle, Raisch, Choate, Whittemore & Hulbert

[57] ABSTRACT

A drop-weight material level indicator in which a spool is mounted above material whose level is to be sensed and is coupled to a motor for selectively unwinding and winding a drop line wound on the spool. The drop line is trained over an idler pulley carried at the end of a pivot arm, and over a second idler pulley to a drop weight. Level sensing electronics are coupled to the second idler pulley for measuring the amount of cable unwound as the drop weight descends toward the upper surface of the material. A magnet is carried on the pivot arm, and a reed switch is positioned adjacent thereto for sensing removal of tension from the drop line and consequent pivotal motion of the arm, and thereby indicating rupture of the drop line to an operator.

8 Claims, 2 Drawing Sheets

DROP-WEIGHT MATERIAL LEVEL INDICATOR

The present invention pertains to drop-weight or sounding-type apparatus for indicating the level of material in a storage container or bin.

Drop-weight material level indicators of the subject type generally include a spool around which a cable or drop line is wound, and a motor coupled to the spool for selectively unwinding and rewinding the drop line on the spool. The drop line is trained from the spool around a first idler pulley carried by a spring-biased arm for applying tension to the cable, around a second idler pulley and thence to a drop weight which is suspended by the line above the material whose level is to be measured. The second idler pulley is coupled to a device for indicating the amount of line unwound during a measurement operation as a function of rotation of the second idler pulley.

Most preferably, the various components of the level indicator or sensor are mounted within a closed housing divided into two chambers by a mounting panel or wall. The electrical components, including the motor and the sensing electronics, are mounted on one side of the panel, while the mechanical components, including the drop line spool, idler pulleys and arm, are mounted on the opposing side of the panel and sealed from the electrical components. The mechanical chamber, which is open to the material bin, is thus sealed from propagation of sparks or the like generated in the electrical chamber. Drop-weight material level indicators of the described character are disclosed, for example, in U.S. Pat. Nos. 3,838,518 and 4,255,859.

Drop-weight material level indicators of the described character, including in particular those disclosed in the noted U.S. patents, have enjoyed substantial commercial acceptance and success. However, improvements remain desirable. For example, the drop-line can rupture or break, particularly when material is added to the bin during a measurement operation so that the drop line weight become buried before retraction. The operator, who is not aware that the line has ruptured, can repeatedly attempt to take a level measurement, causing the motor and spool to cycle in the unwinding and winding directions, and occasionally causing the drop line to become seriously tangled on the take-up spool necessitating lengthy and expensive repair. A general object of the present invention, therefore, is to provide a drop-weight material level indicator of the described character which embodies facility for sensing a ruptured drop-line condition and for indicating such condition to an operator who may then order or implement repairs as required.

Briefly stated, in accordance with the present invention, sensing apparatus is mounted on the indicator support structure and is responsive to pivotal motion of the arm upon removal of tension from the line to indicate a ruptured drop-line condition. In the preferred embodiment of the invention, such rupture-sensing facility comprises a sensor mounted at preselected position on the support structure and responsive to pivotal motion of the arm, upon removal of line tension, to a position adjacent to such preselected position. Most preferably, such rupture-sensing facility embodies a permanent magnet mounted on the arm, and a magnetic switch, such as a reed switch, mounted on the indicator support structure. Such magnet-and-switch arrangement is particularly advantageous in explosion-proof applications as described above because the magnet may be carried on the arm within the mechanical chamber while the magnetic switch may be carried within the electrical chamber but remain magnetically responsive to motion of the arm through the agency of magnetic field lines which penetrate the intervening support panel.

The invention, together with additional objects, features and advantages thereof, will be best understood from the following description, the appended claims and the accompanying drawings in which:

The disclosures of above-noted U.S. Pat. Nos. 3,838,518 and 4,255,859, both assigned to the assignee hereof, are incorporated herein by reference for purposes of general background discussion of drop-weight sensors of the subject type.

Figure 1:
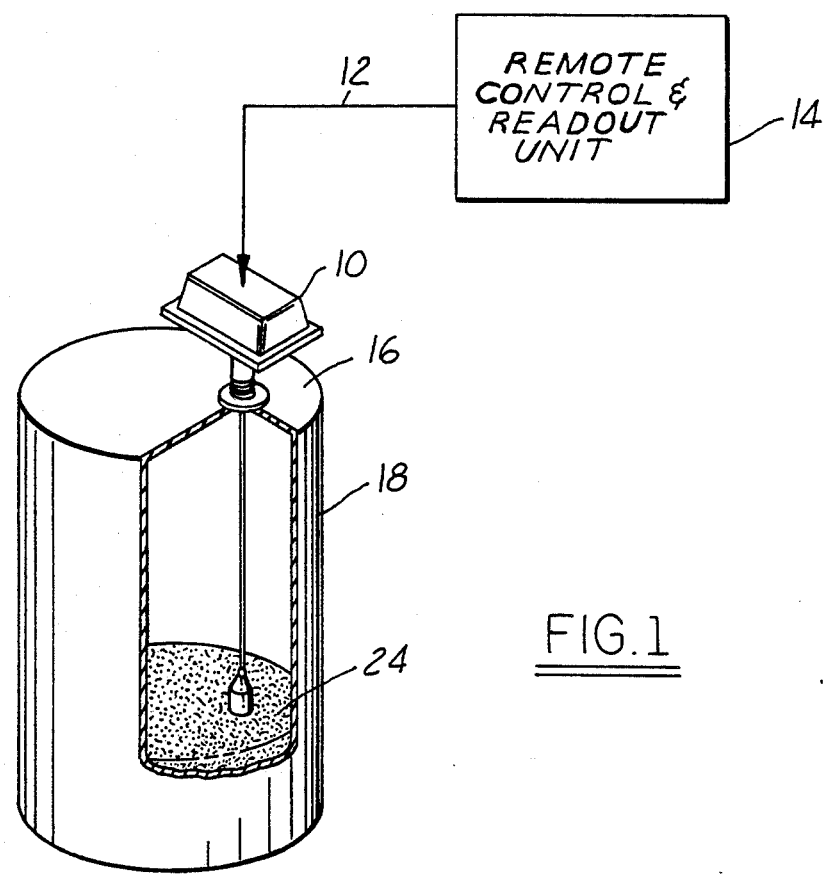
FIG. 1 is a schematic illustration (not to scale) showing a material level system in accordance with a presently preferred embodiment of the invention comprising a modular sensor unit connected to a remote readout unit.
Figure 2:
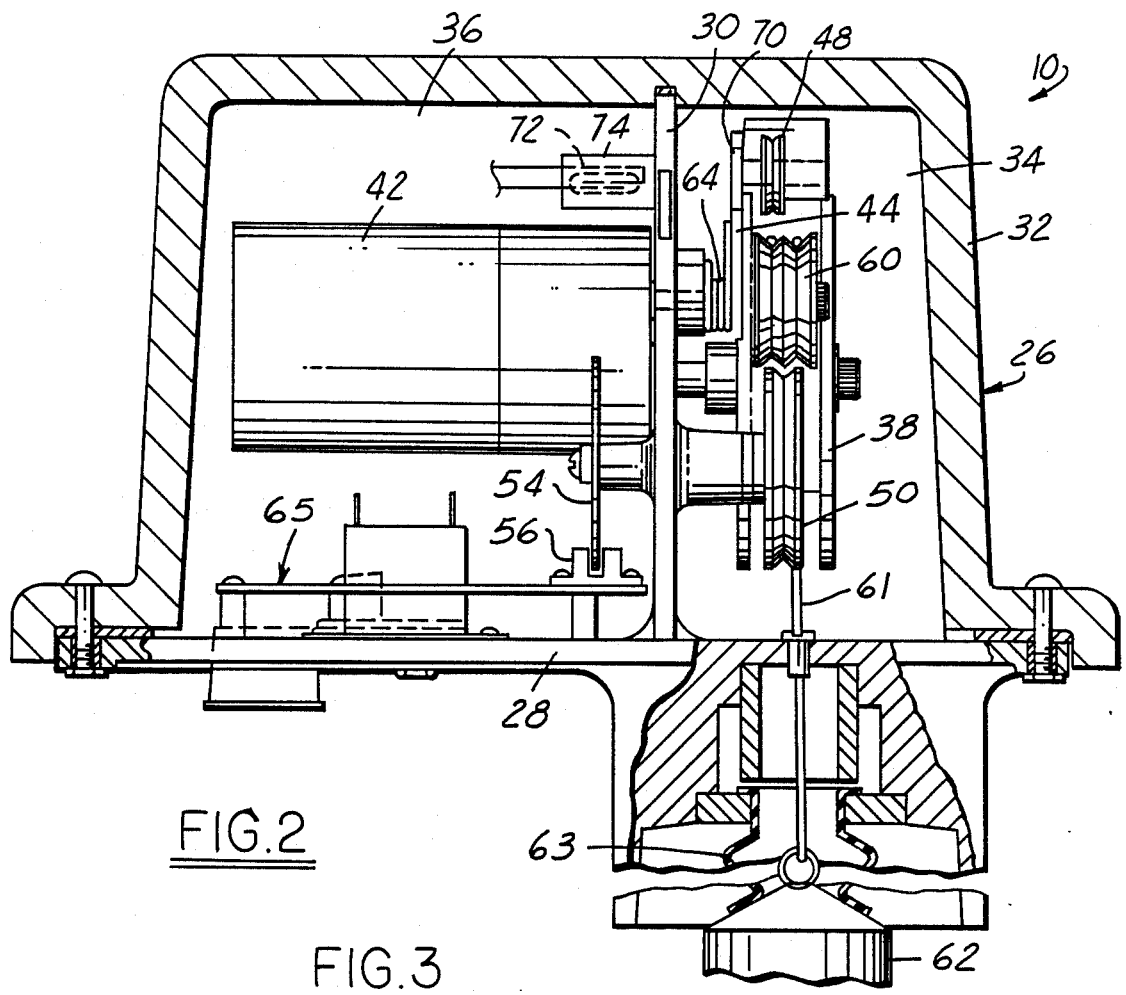
FIGS. 2 and 3 are sectional views in end and side elevation, respectively, of the drop-weight sensor unit in FIG. 1.
Figure 3:
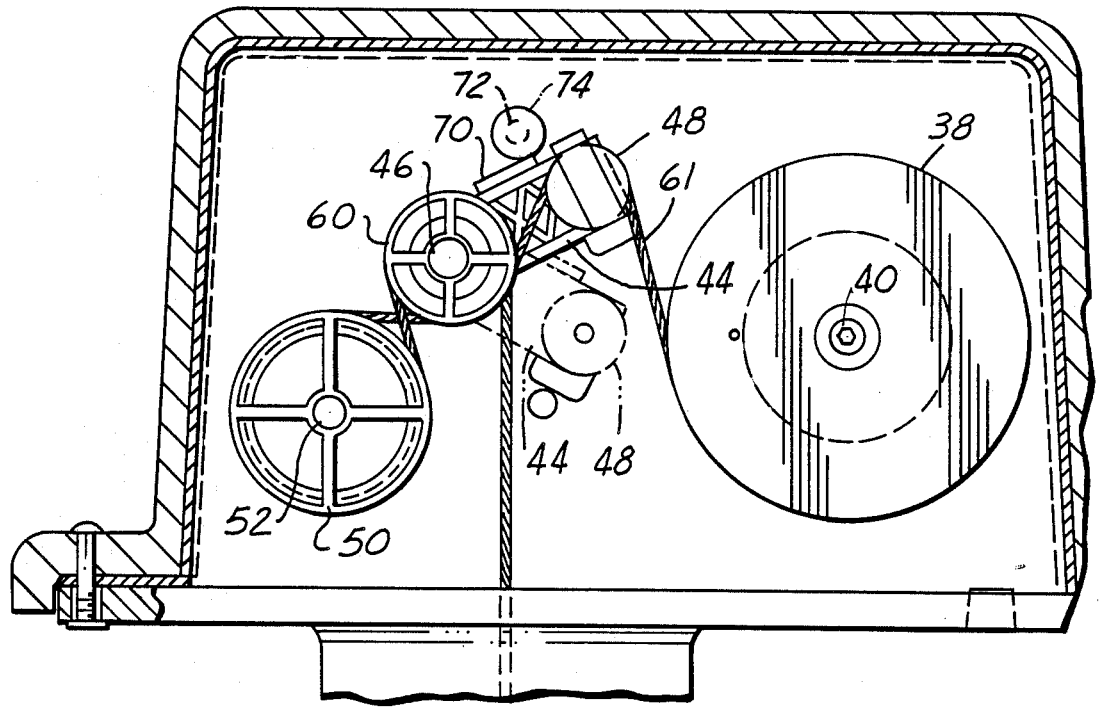

FIG. 1 illustrates a material level indicating system in accordance with a presently preferred embodiment of the invention as comprising a sensor unit 10 connected by a cable 12 to a remote modular readout unit 14. Sensor unit 10 is mounted on the top 16 of a material storage tank or bin 18 and is controlled by readout unit 14 for indicating the level of material 24. FIGS. 2 and 3 illustrate construction of sensor unit 10 in greater detail. A housing 26 includes a flat base 28 and an upstanding integral mounting panel 30. A cover 32 is affixed about the periphery of base 28 and sealingly engages panel 30 so as to form a first chamber 34 for mounting of sensor mechanical components, and a second chamber 36 for the sensor electrical components. A spool 38 is mounted within chamber 34 on a drive shaft 40 that extends through panel 30 to a motor 42 in chamber 36. An arm 44 is pivotally mounted within chamber 34 on a pin or shaft 46 carried by panel 30. An idler pulley 48 is carried at the pivot-remote end of arm 44 and is freely rotatable thereon.

A second idler pulley 50 is rotatably coupled to a shaft 52 that extends through suitable bearings in panel 30 to an optical disc 54 within chamber 36, and thence to an appropriate optical sensor 56. A third idler pulley 60 is freely rotatably mounted on arm pivot pin 46 within chamber 34. A drop line or cable 61 is wound on spool 38 and extends therefrom around pulley 48, pulley 60, pulley 50 and pulley 60, and thence through base 28 to a drop weight 62. A coil spring 64 (FIG. 2) encircles pin 46 and has opposed end tines respectively coupled to arm 44 and support panel 30 for biasing arm 44 against tension in drop line 61 caused by weight of the drop line and weight 62. Electrical circuitry is carried by a circuitboard assembly 65 within chamber 36 and is responsive to remote control and readout unit 14 (FIG. 1) for operating motor 42, and for sensing rotation of disc 54 and providing corresponding signals to the control unit.

To the extent thus far described, sensor 10 is substantially identical to that disclosed in above-noted U.S. Pat.

No. 4,255,859, to which reference may be had for further details.

Figure 4:
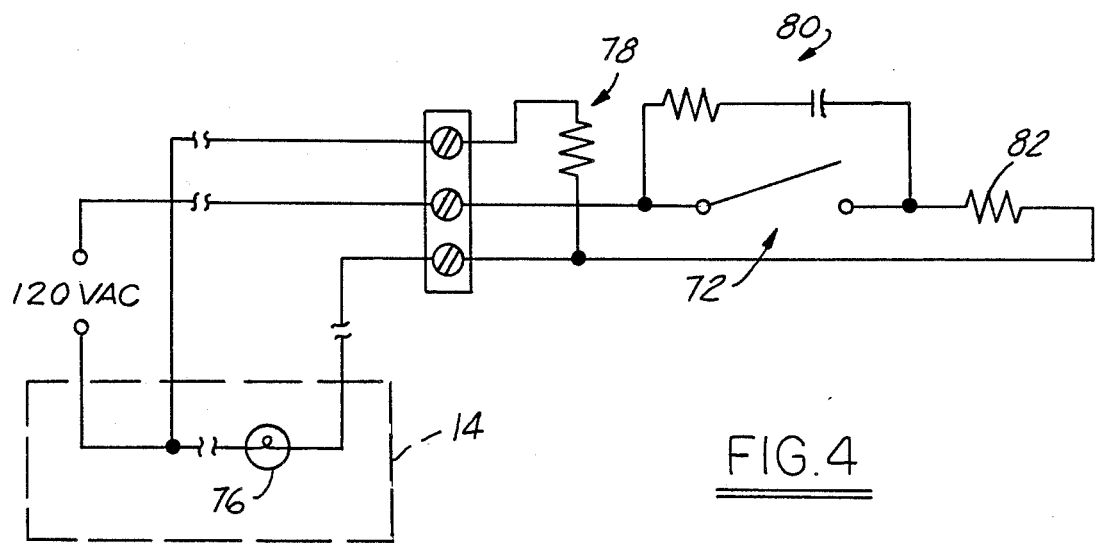
FIG. 4 is an electrical schematic diagram of the broken-line indicating circuitry of the preferred embodiment of the invention.

In accordance with the present invention, a permanent magnet 70 is affixed by adhesive or other suitable means to the upper edge of pivot arm 44 adjacent to pulley 48. A reed switch 72 is removably received in a hollow boss 74 integral with panel 30 within chamber 36 at a position corresponding to an upper pivot position of arm 40 and magnet 70 when weight of drop line 61 is removed—i.e., upon rupture of the drop line. As shown in FIG. 4, reed switch 72 has normally open contacts connected in series with a lamp 76 across electrical power. Noise suppression components 78,80 are connected across switch 72, and a current limiting resistor 82 is connected between switch 72 and lamp 76.

In operation, arm 44, pulley 48 and magnet 70 are normally urged by tension in drop line 61 against the force of spring 64 to the position shown in phantom in FIG. 3. At this position, magnet 70 is spaced from reed switch 72, and reed switch 72 remains open as illustrated in FIG. 4 so that lamp 76 remains de-energized. Control electronics 65 and motor 42 may be selectively energized, either automatically or by an operator as disclosed in noted U.S. Pat. No. 4,255,859, for measuring the level of material 24 within bin 18 (FIG. 1). As drop line 61 and weight 62 descend in a measurement mode of operation, the combined weight thereof hold arm 44 in the line-supporting position (phantom in FIG. 3). When the weight hits and rests upon the upper material surface, continued unwinding of spool 38 permits arm 44 to rise slightly. However, absence of motion at the drop line is sensed by the electronics before arm 44 moves to a position adjacent switch 74. Spool 38 then rewound, and the measurement cycle is completed.

In the event that drop line or cable 61 ruptures for any reason, removal of tension from the drop line allows arm 44 immediately to pivot upwardly to the position shown in solid lines in FIG. 3. At this position, magnet 70 is magnetically coupled to reed switch 72 through panel 30, which is of suitable non-magnetic construction such as aluminum. Such magnetic coupling closes reed switch 72 and energizes lamp 76, which is preferably located at remote control and readout unit 14, so as to advise an operator that the sensor drop line has ruptured and requires repair. It will be noted that the ruptured-cable sensing mechanism is operable both during a measurement cycle—i.e., while weight 62 is descending—and during standby when weight 62 is drawn by line tightly against sealing bellows 63 (FIG. 2).

Although the invention has been described in connection with a presently preferred embodiment thereof illustrated in the drawings, it will be appreciated and recognized that many alternatives and modifications may be implemented without departing from the general principles of the invention. For example, non-magnetic sensors responsive to motion of lever arm 44, may be employed. However, magnetic-type sensors of the described character are preferred, both by reason of economy and because of ready implementation without necessity for breaching panel 30 and thereby potentially compromising explosion-proof character of the overall unit. Switches other than reed switches responsive to the magnetic field, such as Hall effect sensors or the like, may be employed. The ruptured-line sensor may be coupled to control electronics either within the sensor unit or within the remote control and readout unit, for automatically inhibiting selection of the sensor unit and activation of motor 42. An alarm or other device may be activated for calling an operator's attention to the need for drop-line repair.

The invention claimed is:

1. A drop-weight material level indicator comprising: support means adapted to be mounted above a material surface whose level is to be sensed; a spool mounted on said support means to rotate about a fixed spool axis; a drop line attached at one end to said spool and having a drop weight suspended from the other end; a motor rotationally coupled to said spool selectively for winding and unwinding said drop line on said spool; an arm mounted on said support means to pivot about a fixed pivot axis; spring means coupled to said arm and to said support means for biasing said arm to pivot in one direction; a first idler pulley freely rotatably carried by an end of said arm remote from said lever axis; a second idler pulley freely rotatably carried by said support means, said drop line being trained from said spool over said first and second idler pulleys such that tension in said drop line urges said arm to pivot in a second direction opposite to said one direction against force of said spring means; level sensing means including means responsive to rotation of said second pulley for indicating material level; and means responsive to motion of said arm about said pivot axis for sensing rupture of said drop line.

2. The indicator set forth in claim 1 wherein said rupture-sensing means comprises means mounted at preselected position on said support means and responsive to pivotal motion of said arm in said one direction to a position adjacent to said preselected position.

3. The indicator set forth in claim 2 wherein said rupture-sensing means includes means for providing an electrical signal indicative of a said ruptured drop line, and wherein said level sensing means includes electrical circuit means for providing electrical signals indicative of material level.

4. The indicator set forth in claim 3 wherein said support means comprises a closed housing and a support panel sealingly dividing said housing into first and second chambers, all electrical components of said indicator, including said motor, said electrical circuit means and said rupture-indicative signal-providing means, are mounted in one of said chambers and sealed from the other.

5. The indicator set forth in claim 4 wherein said rupture-sensing means comprises permanent magnet means carried by said arm, and magnetic field sensing means carried by said support means at said preselected position for providing said electrical signal indicative of said rupture drop line.

6. The indicator set forth in claim 5 wherein said field-sensing means comprises a reed switch.

7. The indicator set forth in claim 4 wherein said support means, including said housing and said panel, is of explosion proof construction and includes means for coupling said rupture sensing means through said support panel without compromising said explosion proof construction of said support means.

8. The indicator set forth in claim 1 wherein said rupture-sensing means comprises means for providing an electrical signal indicative of said ruptured drop line, and means responsive to said electrical signal for indicating existence of the ruptured drop line.

* * * * *